United States Patent
Harchanko et al.

(10) Patent No.: US 7,177,236 B2
(45) Date of Patent: Feb. 13, 2007

(54) OPTICAL DISC HEAD INCLUDING A BOWTIE GRATING ANTENNA AND SLIDER FOR OPTICAL FOCUSING, AND METHOD FOR MAKING

(75) Inventors: John Harchanko, New Market, AL (US); Michele Banish, Huntsville, AL (US)

(73) Assignee: MEMS Optical, Inc., Huntsville, AL (US)

( * ) Notice: Subject to any disclaimer, the term of this patent is extended or adjusted under 35 U.S.C. 154(b) by 274 days.

(21) Appl. No.: 10/318,189

(22) Filed: Dec. 13, 2002

(65) Prior Publication Data

US 2003/0210637 A1   Nov. 13, 2003

Related U.S. Application Data

(60) Provisional application No. 60/346,615, filed on Jan. 10, 2002, provisional application No. 60/339,103, filed on Dec. 13, 2001.

(51) Int. Cl.
*G11B 7/18* (2006.01)

(52) U.S. Cl. ............... 369/13.33; 369/112.04; 369/13.29; 343/756; 343/763

(58) Field of Classification Search ............ 369/13.33, 369/112.04, 112.17, 13.29, 13.3; 363/756, 363/793; 343/756, 793
See application file for complete search history.

(56) References Cited

U.S. PATENT DOCUMENTS

| 3,188,642 | A | * | 6/1965 | Bock et al. .................. 343/756 |
| 5,125,750 | A | | 6/1992 | Corle et al. |
| 5,432,374 | A | | 7/1995 | Norton |
| 5,497,359 | A | * | 3/1996 | Mamin et al. ........... 369/44.15 |
| 5,581,267 | A | * | 12/1996 | Matsui et al. ............... 343/837 |
| 5,696,372 | A | | 12/1997 | Grober et al. |
| 6,028,562 | A | * | 2/2000 | Guler et al. ................. 343/771 |
| 6,091,374 | A | | 7/2000 | Barnes |
| 6,396,789 | B1 | * | 5/2002 | Guerra et al. .......... 369/112.01 |
| 6,407,708 | B1 | | 6/2002 | Jasper, Jr. |

(Continued)

FOREIGN PATENT DOCUMENTS

WO    WO 99/64929 A1   12/1999

OTHER PUBLICATIONS

Grossman, E. Ed., "Lithographic Antennas For Submillimeter and Infrared Frequencies", EMC-A Global Concern. IEEE1995 International Symposium on Electromagnetic Compatibility. Atlanta, Aug. 14, 1995, International Symposium on Electromagnetic Compatibility, New York, IEEE, US, Aug. 14, 1995, pp. 102-107.

(Continued)

*Primary Examiner*—Wayne Young
*Assistant Examiner*—Michael V. Battaglia
(74) *Attorney, Agent, or Firm*—McGrath, Geissler, Olds & Richardson, PLLC (57) ABSTRACT

A slider system have been developed to aid in the spacing between read/write heads and the storage medium, and a grating antenna amplifier has been developed to improve illumination spot size and polarization characteristics. The grating antenna can be attached to a grayscale slider to obtain a distance between the illumination spot and antenna that lies in the near field region.

23 Claims, 8 Drawing Sheets

GRATING ANTENNA PREFERRED EMBODIMENT

U.S. PATENT DOCUMENTS

| | | |
|---|---|---|
| 6,445,453 B1 * | 9/2002 | Hill .............................. 356/450 |
| 6,587,308 B2 * | 7/2003 | Sannino et al. .......... 360/236.3 |
| 6,795,380 B2 * | 9/2004 | Akiyama et al. ........ 369/13.33 |
| 6,982,844 B2 * | 1/2006 | Rettner et al. ................. 360/59 |
| 7,019,704 B2 * | 3/2006 | Weiss .......................... 343/770 |
| 2001/0009541 A1 | 7/2001 | Kiichi |
| 2003/0072245 A1 * | 4/2003 | Ueyanagi ............... 369/112.24 |
| 2004/0085861 A1 * | 5/2004 | Hamann et al. ......... 369/13.01 |

OTHER PUBLICATIONS

A. A. Lestari, A. G. Yarovoy, L.P. Ligthart, Improvement of Bow-Tie Antennas for Pulse Radiation, 2002, International Research Centre for Telecommunications-transmission and Radar, Delft University of Technology.*

* cited by examiner

FIG. 1.

PRIOR ART

FIG. 2.

PRIOR ART

FIGURE 3: GRATING ANTENNA PREFERRED EMBODIMENT

OPTICAL DISC HEAD INCLUDING A BOWTIE GRATING ANTENNA AND SLIDER FOR OPTICAL FOCUSING, AND METHOD FOR MAKING

This application claims priority on provisional Application No. 60/339,103 filed on Dec. 13, 2001, and Application No. 60/346,615 filed on Jan. 10, 2002, the entire contents of which are hereby incorporated by reference.

BACKGROUND OF THE INVENTION

1. Field of the Invention

The present invention relates to optic antennas, optics lenses, and the positioning of electromagnetic readers and writers. More particularly, it relates to the use of microlayered optical lenses and shaped surfaces, a portion of which contains a continuously varied surface, coupled with an amplifying grating antenna as an optical head to create a localized optical spot of desired polarization, at a desired distance with a maximum peak in intensity.

2. Background Information

The storage of information in magnetized medium often is limited by the spot size of light intensity focused at the desired storage location. The intensity loosens the polarization of the medium so that a logical/analog bit may be stored. The smaller the spot size the smaller the storage space required for a bit, thus, the more information that can be stored on the medium.

To obtain a localized spot, current systems illuminate an antenna, which reradiates the light, forming various patterns some of which contain parts that are localized with a reasonable intensity to be used for storing/reading logical/analog bits in a medium. Spot sizes smaller than the illuminating wavelength ($\lambda$) can be achieved by antennas composed of multiple conductive elements, separated by a gap whose lateral dimension is much smaller than $\lambda$, positioned in the path of the incident illumination.

Figure 1:
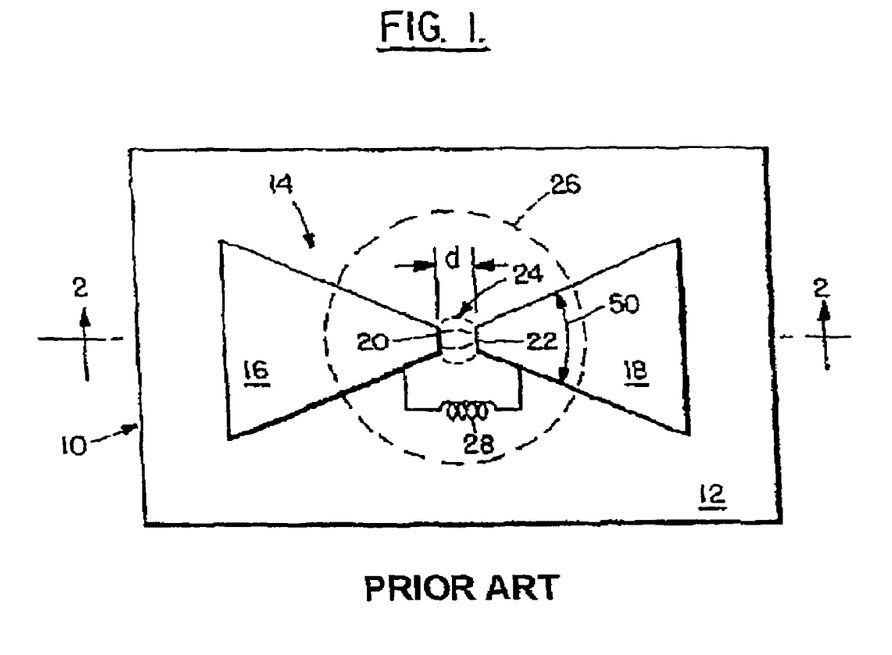
FIGS. 1 and 2 illustrate a conventional solid bowtie antenna system.
Figure 2:
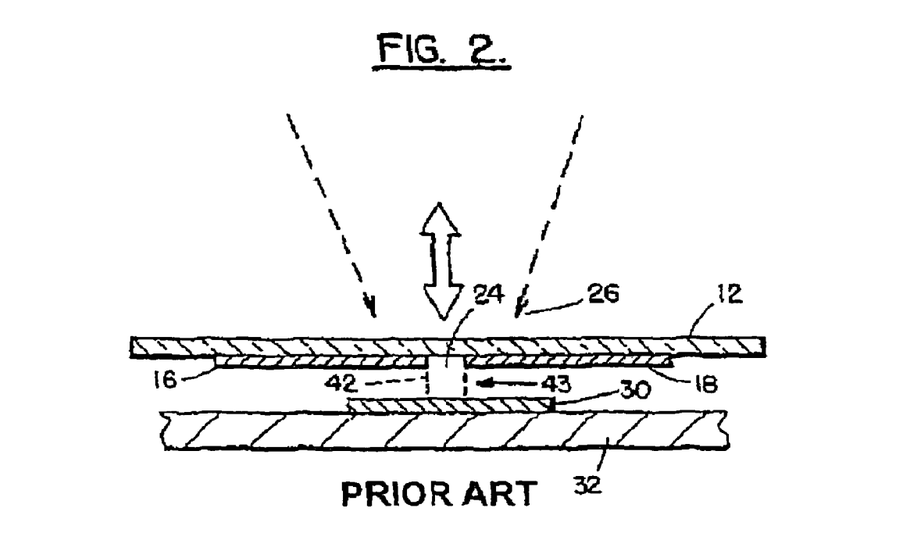

An example of a conventional system is the antenna system of Grober et al. (U.S. Pat. No. 5,696,372). FIGS. 1 and 2 show the Grober antenna, comprised of two antenna arms 16 and 18, with a gap 24 of transverse dimension "d" separating terminations 20 and 22 of conductive arms 16 and 18 respectively. The incident illumination forms an initial spot size 26 on a target medium 30. When the antenna is placed in the illumination path the incident illumination on the antenna arms 16 and 18 results in induced currents in the conductors (16 and 18). The induced currents result in charge accumulation at the terminals 20 and 22 and thus a resultant displacement current is created between the terminals. The displacement current causes re-radiation similar to that caused by a dipole of dimension "d" forming a spot size of similar dimension on the target medium 30.

To read information the gap 24 is placed close to the target medium 30 to be queried. Fluctuations in the near field 43 of the gap 24 produced by illumination of the target medium 30 (e.g., off-axis illumination, illumination from beneath the target medium 30, self induced emanations, etc . . . ) results in induced currents in the conductive arms 16 and 18 which, as described above, cause reradiated illumination. The reradiated illumination can be directed up (away from the target medium 30) through the optics to be read.

A disadvantage of multiple solid antennas is that the re-radiated field becomes depolarized during the superposition process resulting in lower than desired maximum peak in the irradiated field and a larger than desired spot size at the desired distance from the antenna.

Hence a system/device/method, which can create a smaller spot size, while maintaining the polarization, can enable the storage and reading of larger amounts of data.

Figure 6:
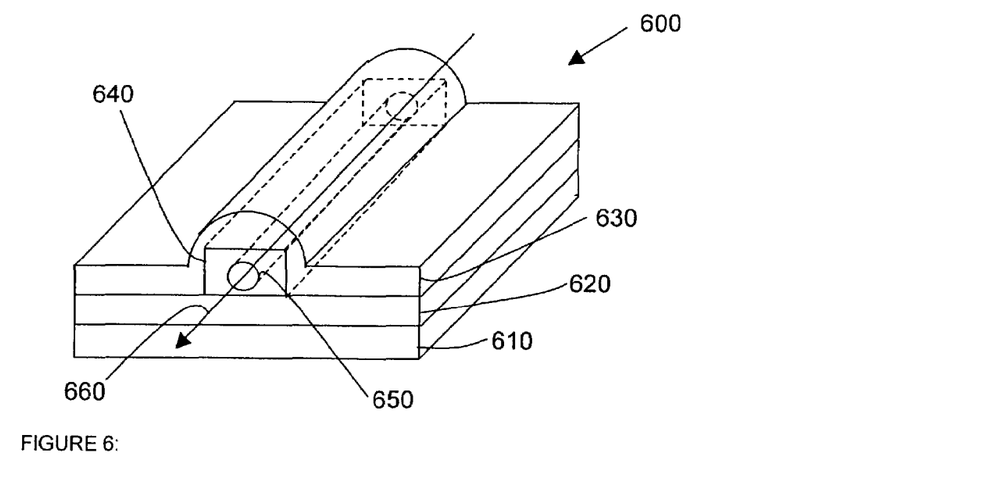
FIG. 6 shows a background art delivery waveguide structure.

The read and write functions take place in the near field region. In addition to decreased illumination spot sizes, placement of the antenna relative to the target medium is important. Several mechanisms have been developed to sweep the reading and writing system over the target medium. FIG. 6 shows a conventional system, 600, for channeling a focused optical beam 660 onto a localized spot (760 in FIG. 7). The device is a layer of silicon 610 upon which several layers of metal are deposited 620 and 630. Underneath one of the layers is deposited a waveguide 640 containing either a hole or a different index of refraction material 650. The device is turned on its side and used to channel/guide an optical beam 660 to a desired spot on a recording media.

Figure 7:
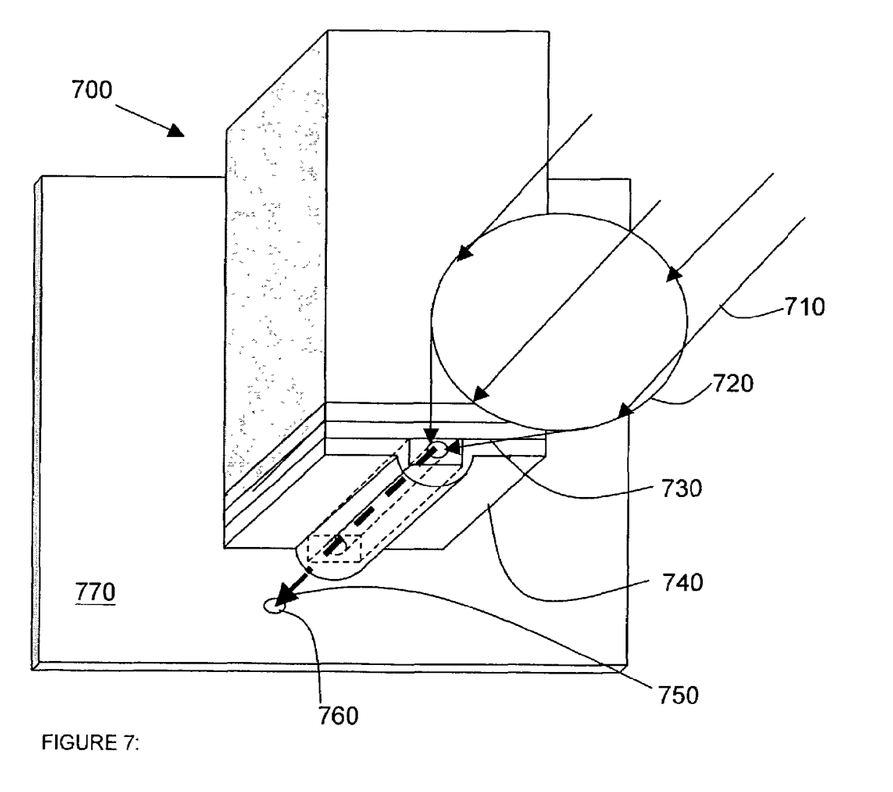
FIG. 7 shows the use of the structure shown in FIG. 6 to focus an optical beam.

FIG. 7 shows the use of the device described above as shown in FIG. 6 in a read/write device 700 for use in a rotating magnetic or optical storage and retrieval system. An optical beam illumination 710 is focused onto the entrance of the waveguide structure 740 by a condensing lens 720, which condenses the initial illumination 710 into a condensed illumination 730. The internally reflected beam travels through the waveguide exiting as guided illumination 750, illuminating the target medium 770 at an illumination spot 760. Typical disadvantages of devices similar to that described are the size of the components; that the component parts must be accurately attached to each other; and the spot sizes are 200 nm or greater, which becomes the limiting factor of the recordable medium's storage space. The need to assemble diverse components also substantially increased cost.

A delivery system that can maintain the optimum spacing between the read/write system and the target material aids to increase storage rates by providing stable conditions by which to estimate the amount of time needed to store a logical/analog polarization value.

Therefore an integrated delivery system, providing optimum spacing between the target medium and the read/write head alone or in conjunction with a system/device/method that can create a smaller spot size, while maintaining the polarization, can enable the storage and reading of larger amounts of data in a cheaper and more reliable fashion than previous systems.

SUMMARY OF THE INVENTION

It is therefore an object of the present invention to provide a read/write system capable of maintaining a desired position of the read/write head to the target material using a shaped surface integrated with the read/write system.

It is further an object of the present invention to provide a grating antenna or set of grating antennas, whose superimposed re-radiated fields result in a desired spot size, intensity, and polarization at a desired location which overcomes the problems noted above. The grating antenna composed of a plurality of gratings or a set of gratings.

It is further an object of the present invention to provide a gray scale slider delivery system that aids in the proper separation between a read/write system and a target medium, which integrates components, decreasing fabrication costs and increasing reliability.

These and other objects of the present invention may be realized by providing a set of grating antennas separated by a gap.

Further aspects of the present invention may be realized by providing a delivery system that combines, into a microlayered structure: a condensing lens; a waveguide, which is coupled with a grating antenna; and a grayscale slider which provides lift based on the spinning of the target medium and the shaped surface of the slider to maintain a predetermined near field distance between the delivery system and the target medium.

Various gap distances can separate the set of gratings.

The set of gratings can be non-planar in their orientation.

The grating antennas can include a subset of gratings of various shapes and sizes.

The elements of the grating antenna can each be individually operated.

The elements of the grating antenna can be non planar with respect to each other.

In addition to a plethora of other uses, the invention can be used for optical etching, optical memory storage devices and localized heating of semiconductor chips.

Further objects of the present invention may be realized by providing several additional microlayers of various indices of refraction to aid in the focusing of the amplifying antenna.

The microlayers may be made of various materials depending on the optical wavelengths used.

The micolayered lens structure may have various shapes.

The microlayered lens structure may be made out of various materials of varying index of refractions.

The microlayered lens structure may contain multiple lenses.

The microlayered lens structure may have an additional layer between the base of the microlayered lens structure and the amplifying antenna.

The microlayered lens structure may contain one layer.

The microlayered lens structure may contain a read and write circuit or be operatively attached to a read and write circuit.

The layers of the microlayered lens structure may contain fluid or have layers or portions composed of liquid crystals.

Further scope of applicability of the present invention will become apparent from the detailed description given herein. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by way of illustration only, and thus are not limitative of the present invention, and wherein.

DETAILED DESCRIPTION

The present invention is a method/apparatus providing a delivery system that aids in the spacing between a read/write system and its target storage medium and/or uses grating antennas to create a small illumination spot size while maintaining a useful level of polarization.

Grating antennas are similar to diffraction gratings, which result in superpositions of transmitted fields. The superpositions result in maximum and minimum peaks of the irradiated field as a function of the position from the grating. The resultant peaks have more localized spatial positions than a diffraction grating or a solid two-piece antenna, as described in the background art, provides. Hence providing grating structure to an antenna results in localized peaks of intensity that are smaller in dimension than that which can be obtained by solid re-radiating displacement current antennas.

Figure 3:
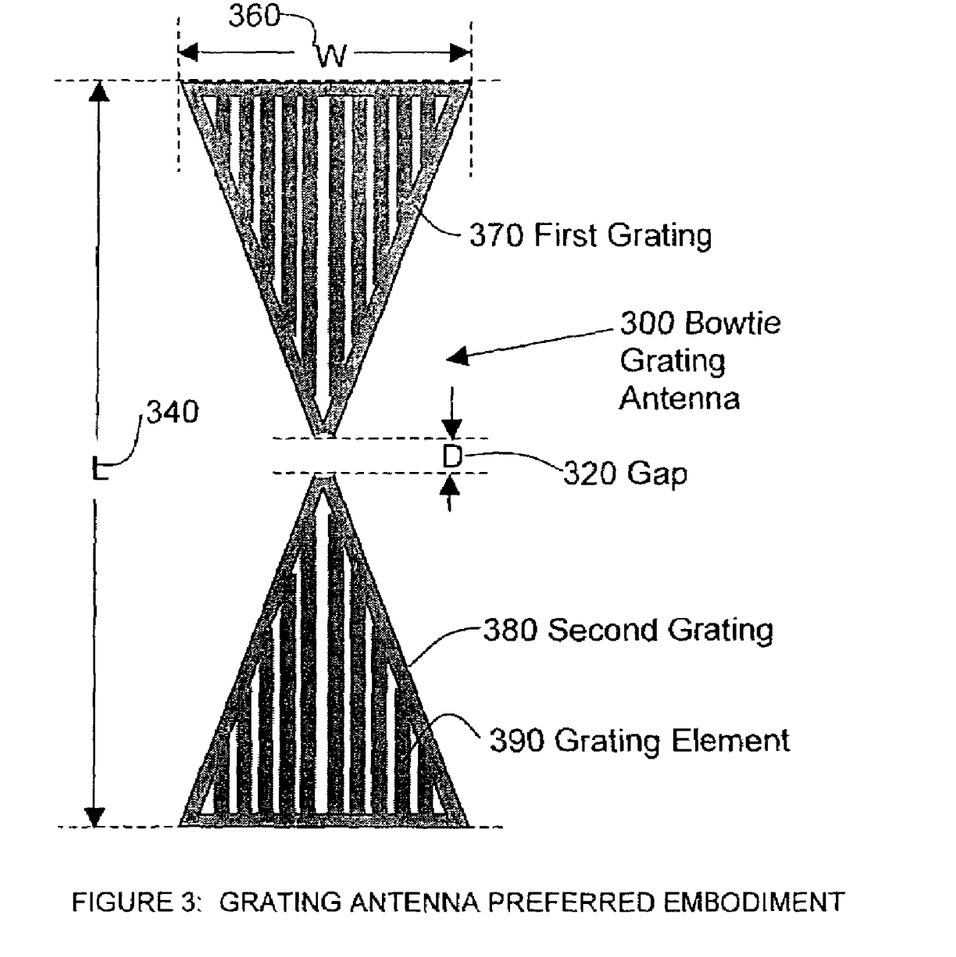
FIG. 3 illustrates the preferred embodiment of a grating antenna according to the present invention.

A grating antenna 300 according to a preferred embodiment of the present invention is illustrated in FIG. 3. In this embodiment a bowtie grating antenna 300 is composed, but not limited to, two triangular, but not limited to triangular, sets of gratings 370 and 380, each set composed of a group of grating elements 390. The gratings 370 and 380 are separated by a gap distance "D" having similar purpose as "d" in FIG. 1, as discussed above. The length "L" 340 of the arranged gratings 370 and 380 can vary from millimeters to nanometers. Likewise in similar range the width "W" 360 of the gratings can vary from millimeters to nanometers. The dimensions "W", "L", and "D" will vary depending upon the fabrication method, in any case the dimension "D" is to be smaller than the illuminating wavelength. In the embodiment shown each grating element may be individually varied or operated in a combined mode for the particular said set grating antenna. FIG. 3 shows triangular gratings but as discussed above the present invention is not intended to be limited to triangular shaped gratings. The gratings could be spiral, or circular of any predetermined shape needed to acquire the desired illumination spot pattern.

The gratings can be constructed using micro-processing methods similar to semi-conductor etching, and can be constructed from similar materials that satisfy the desired optical characteristics (e.g., Si, SiN, conductive metals, semiconductors, and other similar material). Likewise the gratings can be micro-formed by processes using adding techniques instead of etching techniques or curing processes to form a pattern in a substance and in the case of curing, a removal process to remove the excess undesired portions. The gratings can be transparent to one polarization of the incident illumination and conductive to a different polarization of the same incident illumination. The discussion herein should not limit the material composition of the gratings. The gratings can be composed of any material that satisfies the conductivity requirements to produce a re-radiated illumination.

The initial illumination can be provided by coherent, semi-coherent, or incoherent illumination systems (e.g., lasers, VCELs, focused lamp systems and other like coherent, incoherent or semi-coherent illumination sources) depending on whether the spot size polarization is important for the particular use of the invention and provided a portion of the illumination contains wavelengths that are larger than the grating separation. Additionally the illumination source can be integrated with the delivery system on a single substrate.

Figure 4:
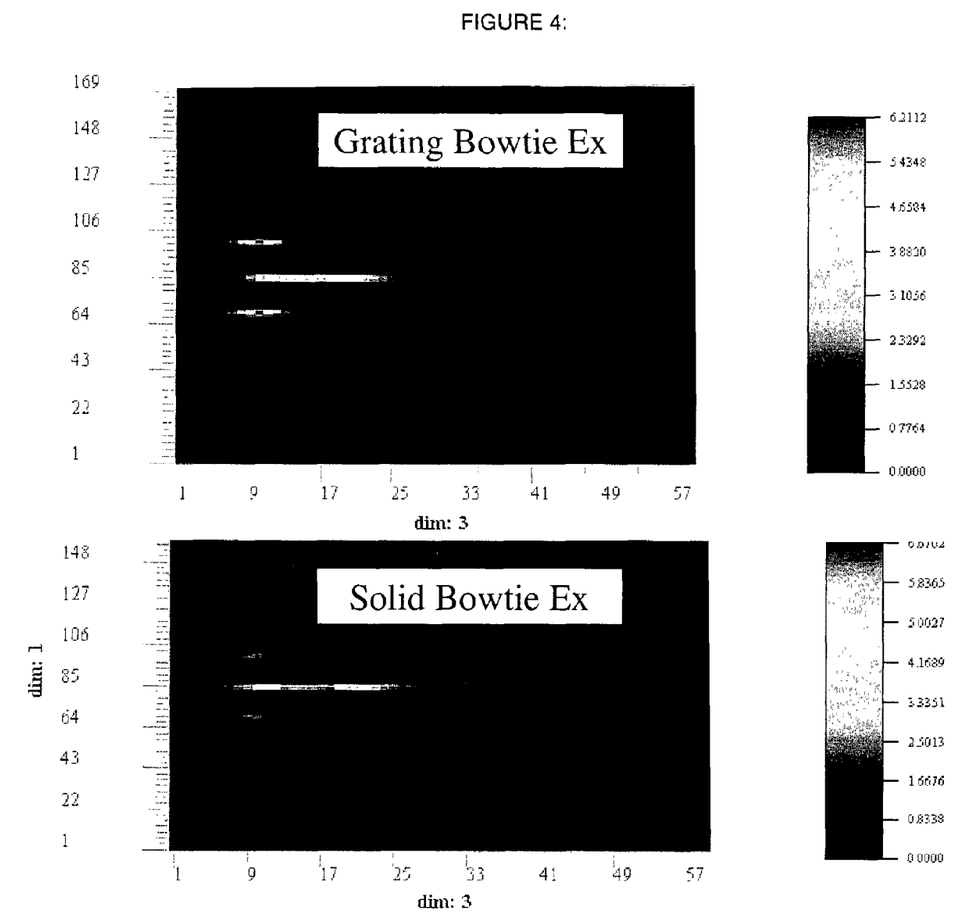
FIG. 4 shows a simulated near field position comparison between a solid antenna and a grating antenna according to an embodiment of the present invention, showing the development of small intense re-radiation spots.

A comparison of the near field region spot pattern generated by a solid bowtie antenna and a grating antenna according to the present invention is shown in FIG. 4. The more intense regions are white. As can be seen the grating bowtie has three bright spot illuminations, a central spot and two lobe spots. The corresponding solid bowtie spot pattern has one bright spot with similar intensity as the central and lobe spots of the grating bowtie antenna, and two dim lobe spots. The central spot of the solid bowtie antenna symbolizes a normal size of illumination currently available. A scan be seen the lobe spots of the grating bowtie antenna are smaller and have similar intensities as the central spot of the solid bowtie antenna. The lobe spots of the grating bowtie can then be used to illuminate a target medium to aid in storing or reading information to or from a smaller dimension than a conventional solid bowtie antenna spot.

Figure 5:
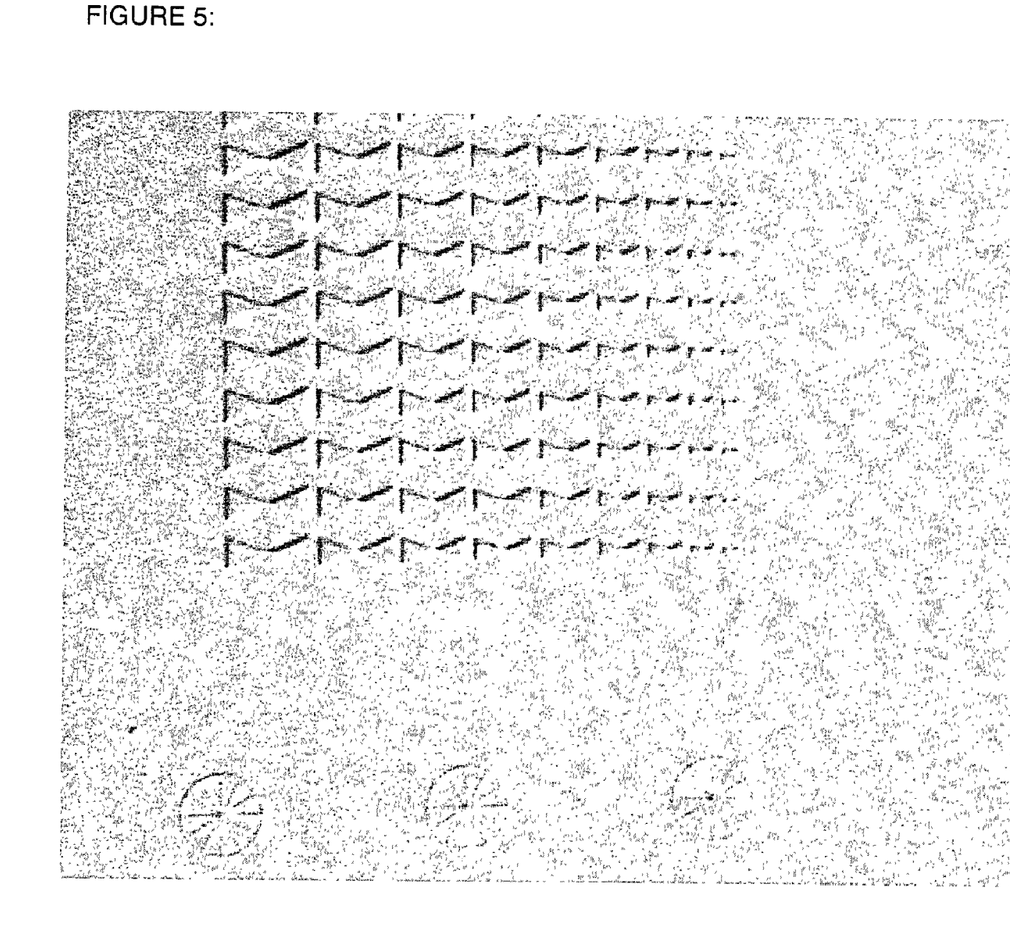
FIG. 5 is a microscopic image of several various size solid bowtie antennas manufactured along with fabricated wheel structures showing the capability of the inventors to fabricate the present invention.

FIG. 5 illustrates micro-formed antennas and radial spoke wheels ranging from micro-meters to nanometers made by processes within the inventor's labs. The same processes and equipment can be used to construct grating antennas in accordance with the present invention.

Figure 8:
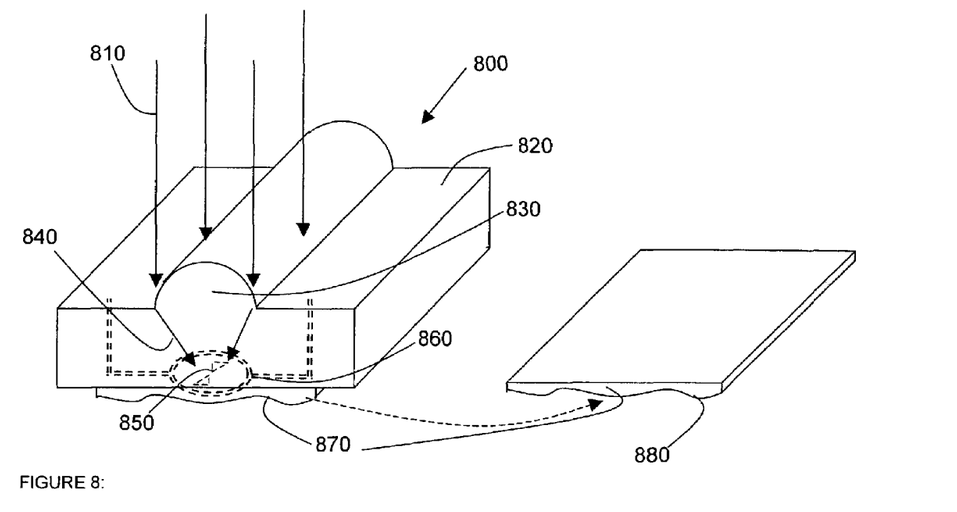
FIG. 8 illustrates the preferred embodiment of the gray scale slider delivery system according to the present invention.

Once an antenna has been constructed a delivery system must be attached to the antenna or near the antenna to direct the illumination light into the antenna and onto the desired location on the target medium. A delivery system 800 constructed in accordance with one embodiment of the invention is shown in FIG. 8. In this embodiment the lens structure 820 receives optical light illumination 810 which passes through a microlens condensing portion 830, the light being condensed 840 by the lens 830, upon an amplifying grating antenna 850 similar to that shown in FIG. 3, where the amplifying antenna 850 is layered onto or embedded in the lens structure 820 or layered over the lens structure and separated by a gap from the lens structure. The bottom of the lens structure 820 can have attached a grayscale slider 870, which contains another layer with a lens or another focusing structure to aid in focusing the light to the amplifying antenna. The amplifying grating antenna 850 will produce a spot on a target medium (1170 in FIG. 11). In a magnetic target medium embodiment, the polarization of the medium may be defined by the driving a read/write circuit 860 as would occur to one of ordinary skill in the art.

Figure 11:
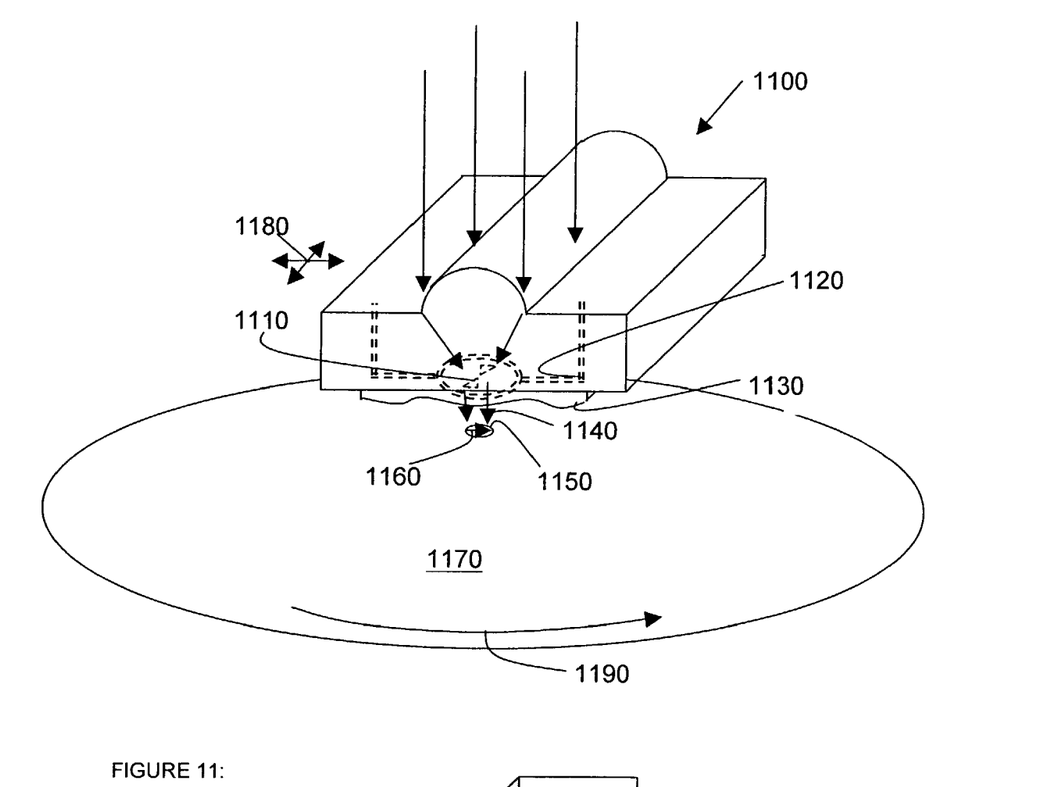
FIG. 11 illustrates the embodiment of FIG. 8 mounted on the gray scale slider, used to maintain various near field positions from the target medium forming a read/write system.

The grayscale slider is a micro machined shaped surface 880 that provides lift to the delivery system 800 when the delivery system is moved with respect to the target medium (1170 in FIG. 11). The shaped surface 880 can be micro-formed or gray scale plasma etched, in which case it is referred to as a gray scale slider. The shaped surface can also be molded using a master mold and either a pressing method where the slider material is pressure stamped, or a curing method where the mold holds a curable substance that takes the shape of the mold upon curing. Although referral is often made to a gray scale slider it is intended that the scope of the slider encompass any shaped surface that is attached or integrated into to the delivery system used to provide lift when moved relative to a target medium. Thus, the discussion herein should not be interpreted to limit the slider to a gray scale slider formed by gray scale processes. The shaped surface 880 can be gradually curved, or stepped, or any combination of shapes needed to acquire the desired lift characteristics.

The amplifying grating antenna 850 can have various shapes and sizes and the discussion herein should certainly not be interpreted to limit the antenna to a triangular shape. It is intended that gratings of various shapes forming an antenna be intended to lie within the scope of the present invention.

Figure 9:
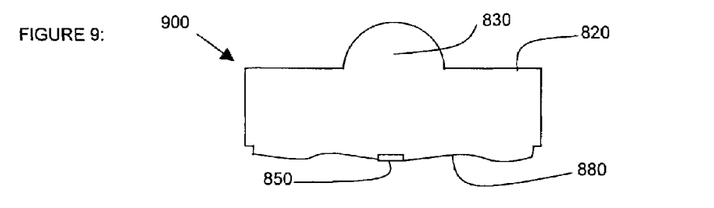
FIGS. 9 and 10 illustrate various integrated slider delivery systems.
Figure 10:
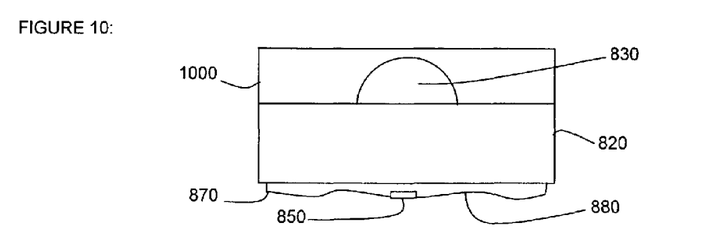

Additionally the amplifying grating antenna 850, lens 830, lens structure 820, and the slider 870 can be integrated into an etched substrate via plasma etching, molding, curing, stamping, deposition or a combination of these processes. The lens structure's 820 surface juxtaposed to the target medium surface can be patterned to form the slider 870 or airfoil to enable the surface to float across the surface of the target medium (e.g. recording material) without touching. FIG. 9 shows an integrated system, etched from a single substrate. Although FIG. 9 illustrates the integration of an antenna 850, lens 830, lens structure 820, and slider surface 880 etched from a single substrate, the various elements may be separately provided in separately etched layers and integrated (e.g. bonded) as shown in FIG. 10, which additionally contains an optional cover layer 1000. The cover layer can be any material that allows a portion of the incident light to be transmitted.

Although not shown in FIG. 10 an additional layer or layers may also be included, with some of these layers including light sources for use with the read/write system (e.g. VIXELS, laser diodes and other like illumination sources that can be included in semi-conductor layer.

FIG. 11 illustrates the use of a device 1100 according to the scope of the present invention. A delivery system, such as that described above with respect to FIG. 8, condenses incident illumination onto a grating antenna 1110. The grating antenna re-radiates the initial radiation forming re-radiated illumination 1140. The re-radiated illumination forms an illumination spot 1150, having a spot polarization 1160, of predetermined intensity on a target medium 1170. The read/write circuit 1120 is used to set or read the polarization of the target medium with the illumination spot 1150. The delivery system shown in FIG. 11 contains a gray scale slider 1130 which provides lift to the delivery system allowing it have relative motion 1180, relative to the target medium 1170 which may rotate 1190. The grayscale slider can be purposely shaped to provide optimum spacing between the target medium 1170 and the read/write system 1100.

Figure 12:
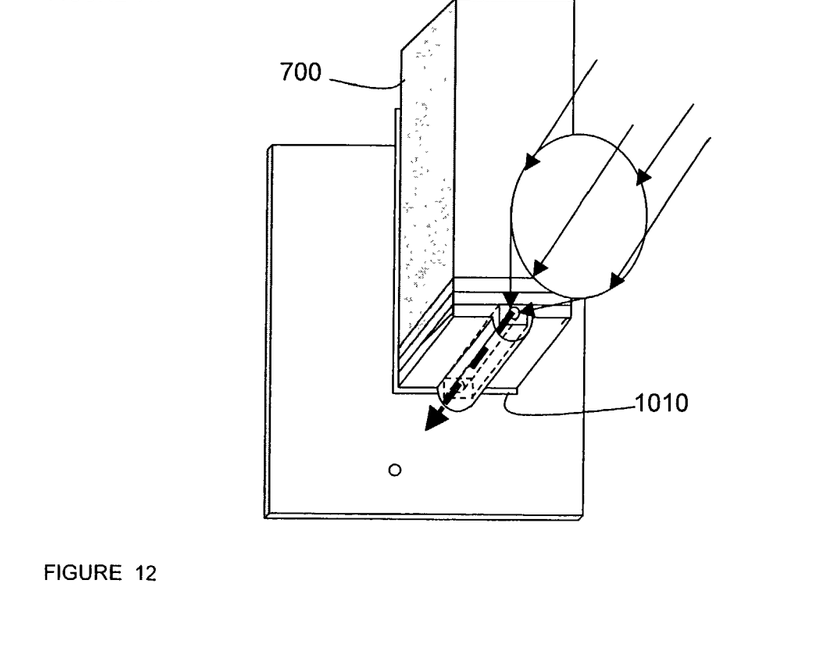
FIG. 12 illustrates an alternative embodiment present invention with a gray scale slider integrated with a conventional read/write system.

In accordance with other embodiments of the present invention the slider may be integrated with a normal read/write system, where the inventive concept is the inclusion of the slider to provide lift to the conventional read/write system. FIG. 12 illustrates the integration of a grayscale slider 1010 with the conventional read/write system shown in FIG. 7.

Figure 13:
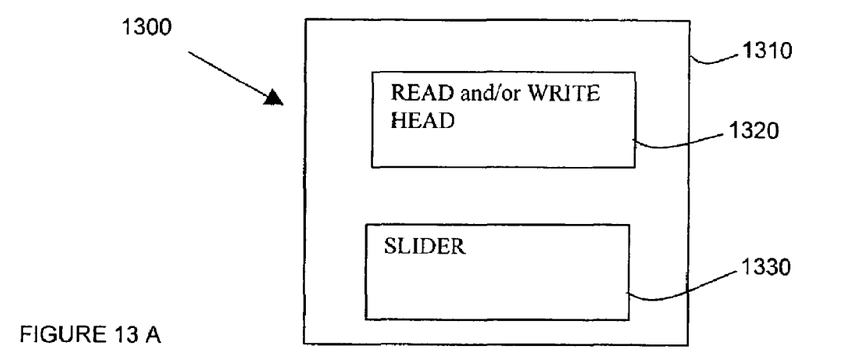
FIGS. 13A and 13B illustrate various combinations of the positioning of the gray scale slider with respect to the read/write head on the surface facing the target medium.

FIGS. 13A and 13B illustrates various combinations of the orientation of the slider surface 880 facing the target material 770. Whether the slider is used with a conventional read/write system or the grating antennas system the slider 1330 can be separated on the surface 1310 from the read and/or write head 1320 as shown in FIG. 13A, or the read and/or write head 1370 can be integrated or layered on the slider 1360.

Many variations in the design of incorporating a grating antenna and/or a slider providing lift to the read/write system may be realized in accordance with the present invention. It will be obvious to one of ordinary skill in the arts to vary the invention thus described. Such variations are not to be regarded as departures from the spirit and scope of the invention, and all such modifications as would be obvious to one skilled in the art are intended to be included within the scope of the following claims.

We claim:

1. An illumination spot formation system comprising:
   a first grating; and
   a second grating, wherein said first and second gratings are illuminated by incident radiation having a characteristic wavelength, where said first and second gratings comprise a plurality of grating elements, said first and second grating being separated a distance smaller than the characteristic wavelength, and where a grating antenna formed by said first and second gratings re-radiates the radiation forming a spot size of a desired size and polarization on a target medium.

2. The illumination spot formation system according to claim 1, wherein the spot size is smaller than that created by a similarly sized and shaped illumination spot formation system containing solid portions in place of said first and second gratings.

3. The illumination spot formation system according to claim 1, further comprising:
   a moveable delivery system, wherein said delivery system comprises: a lens structure, where the lens structure contains an integrated portion that condenses and focuses an incident illumination, where the condensed and focused incident illumination becomes the incident radiation illuminating said first and second gratings, and where the orientation of said first and second gratings is maintained with respect to the lens structure.

4. The illumination spot formation system according to claim 3, further comprising:
   a slider, where the slider is operatively attached to the delivery system on the side of the delivery system facing the first and second gratings, where the slider provides lift to the delivery system so as to position the delivery system above the target medium a desired amount when the delivery system is moved relative to the target medium.

5. The illumination spot formation system according to claim 4, wherein the slider contains a shaped surface, a portion of which is continuously varying, facing the target medium.

6. The illumination spot formation system according to claim 5, wherein gray scale etching creates the shaped surface.

7. The illumination spot formation system according to claim 4, wherein said slider, intercepts the incident radiation before it reaches said first and second gratings and transmits the incident radiation through said slider to said first and second gratings.

8. The illumination spot formation system according to claim 5, wherein said slider, intercepts the incident radiation before it reaches said first and second gratings and transmits the incident radiation through said slider to said first and second gratings, where the shaped surface is used to change the radiation in a predetermined fashion before the radiation is incident upon said first and second grating.

9. The illumination spot formation system according to claim 1, wherein the grating elements are generally parallel and of variable length and spacing from each other.

10. A method of forming an illumination spot comprising:
    positioning first and second gratings, where the first and second gratings are separated a predetermined distance, where said first and second gratings comprise a plurality of grating elements; and
    illuminating the first and second gratings with an incident radiation having a characteristic wavelength greater than the predetermined distance, where the first and second gratings, upon illumination, re-radiate forming a spot of desired size and polarization on a provided target medium.

11. The method according to claim 10, wherein the spot size is smaller than that created by similarly sized and shaped solid portions replacing said first and second gratings.

12. The method according to claim 10, further comprising:
    attaching the first and second gratings operatively to a moveable delivery system, where the moveable delivery system, comprises: a lens structure, where the lens structure contains an integrated portion that condenses and focuses an incident illumination, where the condensed and focused incident illumination becomes the incident radiation illuminating said first and second gratings, and where the orientation of said first and second gratings is maintained with respect to the lens structure; and
    moving the delivery system above the target medium to a desired position, where the illuminated first and second gratings create an illumination spot at the desired position with the desired spot size and polarization.

13. The method according to claim 12, further comprising:
    attaching a slider operatively to the delivery system on the side of the delivery system facing the first and second gratings, where the slider provides lift to the delivery system so as to position the delivery system above the target medium a desired amount when the delivery system is moving relative to the target medium.

14. The method according to claim 13, wherein the slider contains a shaped surface, a portion of which is continuously varying, facing the target medium.

15. The method according to claim 14, wherein gray scale etching creates the shaped surface.

16. A read and write optical system comprising: an amplifying antenna comprising:
    a first grating; and
    a second grating, wherein said first and second gratings are illuminated by incident radiation having a characteristic wavelength, where said first and second gratings comprise a plurality of grating elements, said first and second grating are separated a distance smaller than the characteristic wavelength, and where the amplifying antenna re-radiates the radiation forming a spot size of a desired size and polarization on a target medium; and
    a moveable delivery system, wherein said delivery system comprises: a lens structure, where the lens structure contains an integrated portion that condenses and focuses an incident illumination, where the condensed and focused incident illumination becomes the incident radiation illuminating said first and second gratings, and where the orientation of said first and second gratings are maintained with respect to the lens structure; and a read and write circuit where the read and write circuit sets the polarization of the target medium in the spot, and reads the polarization in the target medium in a predetermined region.

17. The read and write optical system according to claim 16, further comprising:
a slider, where the slider is operatively attached to the delivery system on the side of the delivery system facing the first and second gratings, where the slider provides lift to the delivery system so as to position the delivery system above the target medium a desired amount when the delivery system is moved relative to the target medium.

18. The read and write optical system according to claim 17, wherein the slider contains a shaped surface facing the target medium.

19. The read and write optical system according to claim 18, wherein gray scale etching creates the shaped surface.

20. The read and write optical system according to claim 18, wherein the slider and lens structure are formed on a single substrate.

21. The read and write optical system according to claim 18, wherein the target medium is an optical recording medium.

22. The read and write optical system according to claim 18, wherein the target medium is a magnetic recording medium.

23. The read and write optical system according to claim 18, wherein the incident illumination is provided by VCSEL.

* * * * *